United States Patent
Blasczyk et al.

(10) Patent No.: US 6,571,623 B1
(45) Date of Patent: Jun. 3, 2003

(54) MEASURING INSTRUMENT WITH RECTANGULAR FLOW CHANNEL AND SENSORS FOR MEASURING THE MASS OF A FLOWING MEDIUM

(75) Inventors: Johann Blasczyk, Dormagen (DE); Karl-Heinrich Lösing, Alpen (DE); Thomas Wienecke, Korschenbroich (DE); Peter Witkowski, Jüchen (DE)

(73) Assignee: Pierburg GmbH, Neuss (DE)

( * ) Notice: Subject to any disclaimer, the term of this patent is extended or adjusted under 35 U.S.C. 154(b) by 0 days.

(21) Appl. No.: 09/258,864

(22) Filed: Feb. 26, 1999

(30) Foreign Application Priority Data

Feb. 27, 1998 (DE) .......................... 198 08 248

(51) Int. Cl.$^7$ ................................. G01F 1/68
(52) U.S. Cl. ................. 73/204.22; 73/204.12; 73/204.23
(58) Field of Search ......... 73/204.22, 204.23, 73/204.25, 204.26, 204.11, 202.5, 118.2, 204.21, 204.12, 204.14; 374/31

(56) References Cited

U.S. PATENT DOCUMENTS

| | | | | |
|---|---|---|---|---|
| 3,464,269 A | * | 9/1969 | Froger .................... 73/204.22 |
| 3,931,736 A | * | 1/1976 | Olmsted .................. 73/204.23 |
| 4,080,821 A | | 3/1978 | Johnston .................... 73/27 R |
| 4,283,944 A | * | 8/1981 | Gruner et al. ............ 73/204.26 |
| 4,403,506 A | * | 9/1983 | Lauterbach .............. 73/204.26 |
| 4,498,337 A | * | 2/1985 | Gruner .................... 73/204.26 |
| 4,548,078 A | * | 10/1985 | Bohrer et al. ........... 73/204.22 |
| 4,616,505 A | * | 10/1986 | Jouwsma ................. 73/204.26 |
| 4,776,214 A | * | 10/1988 | Morla et al. ............. 73/204.11 |
| 4,829,818 A | * | 5/1989 | Bohrer .................... 73/204.22 |
| 4,864,855 A | * | 9/1989 | Shiraishi et al. ......... 73/204.21 |
| 4,981,035 A | * | 1/1991 | Hall ....................... 73/204.21 |
| 5,086,650 A | * | 2/1992 | Harrington et al. ...... 73/204.26 |
| 5,257,547 A | * | 11/1993 | Boyer ........................ 73/756 |
| 5,311,775 A | * | 5/1994 | Suski et al. ............. 73/204.26 |
| 5,393,351 A | * | 2/1995 | Kinard et al. ............... 136/225 |
| 5,404,753 A | * | 4/1995 | Hecht et al. ............ 73/204.22 |
| 5,452,610 A | * | 9/1995 | Kleinhans et al. ....... 73/204.26 |
| 5,595,163 A | * | 1/1997 | Nogi et al. .............. 73/204.21 |
| 5,631,417 A | * | 5/1997 | Harrington et al. ...... 73/204.26 |
| 5,708,205 A | * | 1/1998 | Yamada et al. .......... 73/204.26 |
| 5,763,787 A | * | 6/1998 | Gravel et al. ................ 73/756 |
| 5,813,764 A | * | 9/1998 | Visser et al. ................. 374/31 |
| 5,827,948 A | * | 10/1998 | Martell et al. ............ 73/23.31 |
| 5,848,094 A | * | 12/1998 | Buhl et al. ............... 73/204.23 |

FOREIGN PATENT DOCUMENTS

| | | |
|---|---|---|
| DE | 2911631 | 2/1988 |
| DE | 3844354 | 7/1990 |
| DE | 4308227 | 9/1994 |
| EP | 0717270 | 6/1996 |

OTHER PUBLICATIONS

Konzelmann, U., et al., "Breakthrough in Reverse Flow Detection– A New Mass Air Flow Meter Using Micro Silicon Technology", *SAE Technical Paper Series*, Jan. 1995, pp. 105–111.

* cited by examiner

*Primary Examiner*—Harshad Patel
(74) *Attorney, Agent, or Firm*—Ladas & Parry

(57) ABSTRACT

A measuring instrument for measuring mass of a flowing medium in which a measuring body extends across the flowing medium and has a rectangular flow channel through which the medium flows. The flow channel has a constricted inlet, a central portion with parallel sides and a widened outlet. A measuring element is supported in the measuring body such that the medium flows thereon. The measuring element carries temperature and heating sensors.

19 Claims, 3 Drawing Sheets

MEASURING INSTRUMENT WITH RECTANGULAR FLOW CHANNEL AND SENSORS FOR MEASURING THE MASS OF A FLOWING MEDIUM

FIELD OF THE INVENTION

The invention relates to a measuring instrument for measuring the mass of a flowing medium, and particularly for measuring the rate of air flow to the air intake of an internal combustion engine.

BACKGROUND AND PRIOR ART

A device for measuring the mass of a flowing medium of the above type is disclosed in DE 29 11 631 C2. Therein, a heating wire functioning as a temperature-dependent resistance is mounted together with another temperature-dependent resistance on a probe ring projecting in a tubular unit and over a cross-piece to an insert unit. The tubular unit forms the flow cross section, for example, of an intake pipe of a combustion engine. An electrical control unit, which is configured as a hybrid board circuit is adhered onto an assembly plate, in the insert unit. Conductive paths or tracks are formed on a carrier plate by thick-film technology. An increased current is passed to the heating wire after a specific measurement cycle, in order to remove any deposition formed on the heating wire.

DE 38 44 354 A1 disclosed another measuring instrument of the above type. Therein, a ceramic substrate with at least one temperature-dependent resistance layer is mounted on one side of a measuring unit and projects in an air flow passage. This measuring unit is introduced into a flow cross section, such that the flowing medium flows through the flow passage.

In order to avoid a disruption of the ceramic substrate, support elements and protective cross-pieces are provided in the flow passage.

DE 43 08 227 A1 discloses a measuring element for determining the mass of a flowing medium. Therein, a substrate is secured at one side, and a measuring resistance, a heating resistance, and a compensation resistance are disposed on this substrate.

SUMMARY OF THE INVENTION

An object of the invention is to provide a measuring instrument of the above type, which has a simple and robust structure, and an increased insensitivity to contamination.

In accordance with the invention, the measuring element is mounted in the flow passage of a housing such that it is fixed or clamped in the housing on all sides, whereby the flowing medium is guided to flow on one side at or above the measuring element. By embedding the measuring element in the housing, the measuring element is protected from breakage and consequent disruption of service. It also has a robust but simple structure. Because it is fixed in the housing on all sides, the measuring element is also relatively free of stress. The measuring element of this measuring instrument is also protected against the medium flow, since the measuring element is flush with the flow passage of the housing, so that the medium flow cannot attack the measuring element itself.

A cooling unit is conventionally mounted on the measuring element on which sensors are disposed and heat transfer to the ambient atmosphere can be obtained in the direct vicinity of the sensors. It is also advantageous that the measuring element and an electronic component for the necessary evaluation and control of the instrument can be introduced inside this measuring instrument. For this purpose, both the measuring element as well as the electronic component, which are both produced by hybrid board or silicon technology, are integrated adjacent to one another, i.e., in one plane, in the instrument. The sensors of the measuring element are protected from contamination, for example, by being embedded in membranes, which are mounted on a substrate of the measuring element. A measuring element with the utilization of membrane elements on a substrate is disclosed in copending application 09/258,865 filed concurrently herewith and claiming the priority of German Application No. 198 08 249.5.

Both the quantity of the flowing medium as well as its flow direction can be determined with only one measuring instrument, due to the arrangement of two heating sensors and two temperature sensors on one measuring element. The detection of small residual flows of medium is also possible. Both the heating sensors and temperature sensors are respectively accommodated in inside two separate membranes on one substrate.

By providing a frame around the sensor carrier, i.e., around the measuring element, an optimal flow channel geometry is produced, whereby a constriction is set up in the flow passage.

BRIEF DESCRIPTION OF THE FIGURES OF THE DRAWING

FIG. 3 is a sectional view taken on line III—III in FIG. 2a.

DETAILED DESCRIPTION

Figure 1:
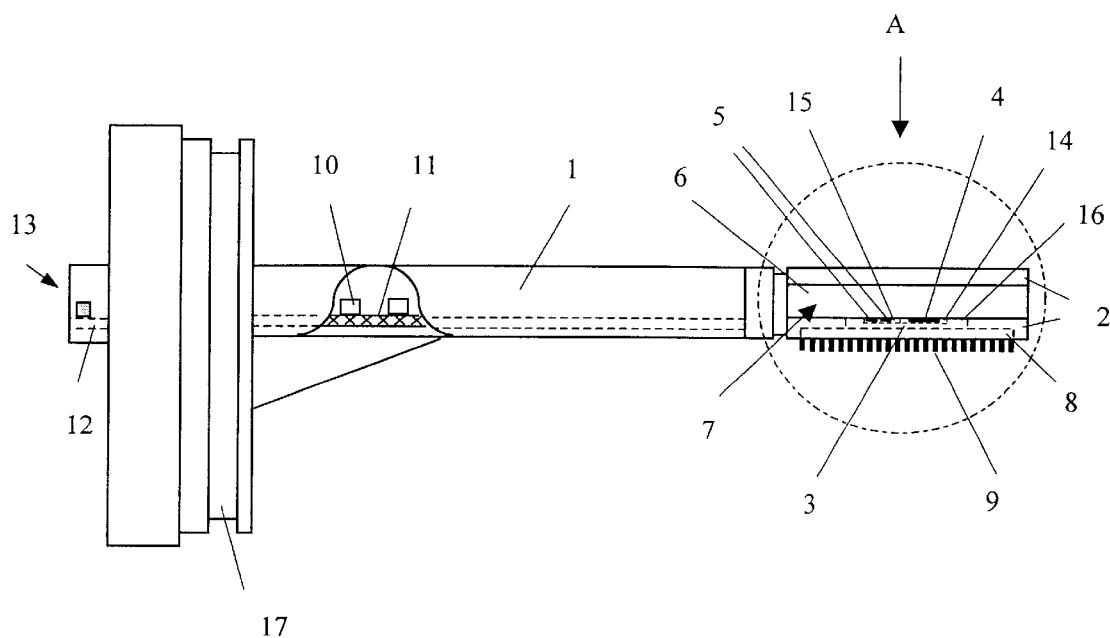
FIG. 1 diagrammatically illustrates a measuring instrument according to the invention.

The measuring instrument shown in FIG. 1 has a measuring unit 1 which is provided with a housing 2 for a measuring element 3 on which are mounted a heating sensor 4, a temperature sensor 5, and other elements (not shown) of a measuring circuit. A flow passage 6 for a flow 7 is incorporated in housing 2. Measuring element 3 lies in a plane in housing 2 above or below flow 7 approximately centrally in flow passage 6. A cooling unit 8, for example, of aluminum, with fins 9 is integrated on measuring element 3 and preferably in housing 2.

Electronic components 10 are accommodated in measuring unit 1 on a hybrid P.C. board 11, and these components are joined electrically by means of a connector plug 12 in connection part 13 to another electronic unit or a current supply unit (not shown) for controlling the intake air as well as various indicators (not shown). Electronic components 10 may contain complete evaluation and control electronics, for example, a microprocessor, and it is installed with connections and conductive tracks optionally in the form of a printed circuit on hybrid board 11 as well as being connected to measuring element 3.

Figure 2:
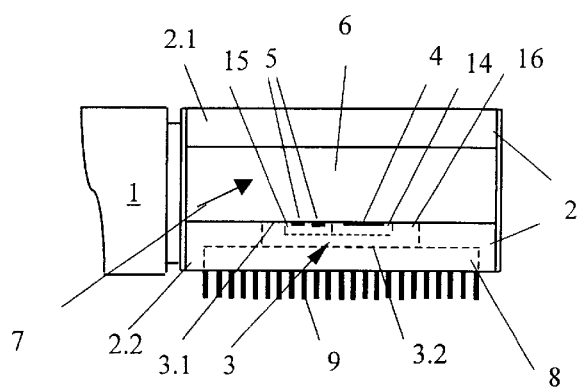
FIG. 2 shows, on enlarged scale, a detail A of the measuring instrument of FIG. 1.
Figure 4:
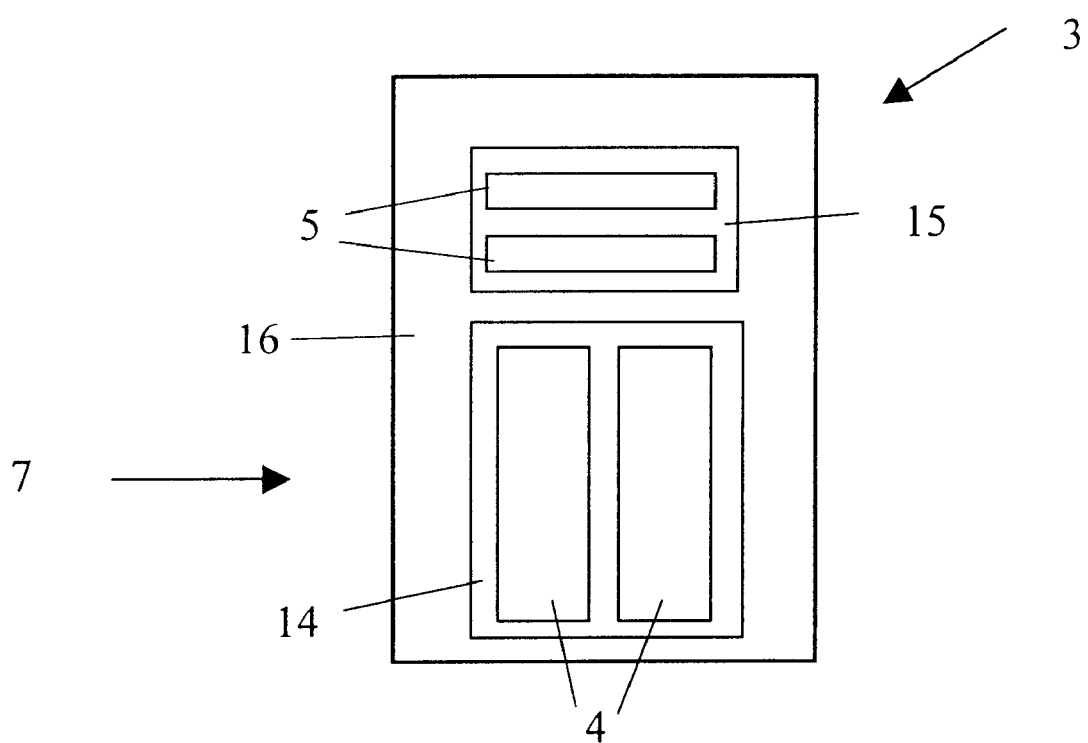
FIG. 4 is a top plan view of the measuring element.

Housing 2 is shown slightly enlarged in the region of flow passage 6 in FIG. 2. In this embodiment, housing 2 is constructed in one piece and is produced, for example, by injection molding after introducing measuring element 3. Measuring element 3, which is shown in more detail in FIG. 4, is recessed in housing 2 and is flush with outer surface 3.1 of housing 2 in the lower region 2.2 of the housing. Cooling unit 8 with fins 9 is adhered to the lower surface 3.2 of measuring element 3, preferably by a heat-conducting adhesive.

Figure 2A:
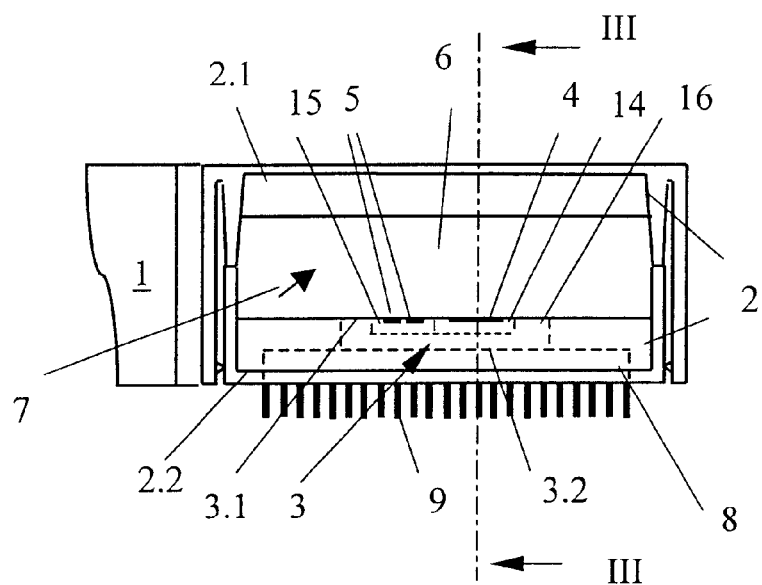
FIG. 2a shows another embodiment of detail A of the measuring instrument of FIG. 1.

FIG. 2a shows a variation of the housing. Therein, housing 2 is made in two parts, such that upper housing part 2.1 is snapped onto lower housing part 2.2. Also, measuring element 3 seals the surface of the lower housing part 2.2. Flow passage 6 is formed by the two parts 2.1 and 2.2. of housing 2.

Figure 3:
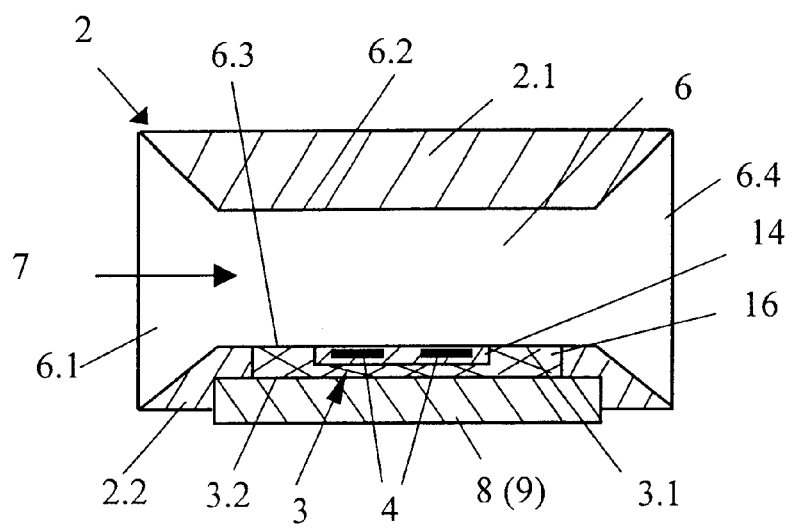

Flow passage 6 has a rectangular cross-section as shown in FIG. 2 and in FIG. 3. This flow passage 6 forms a flow channel, which has a constriction in the inlet section 6.1, and parallel sides 6.2 and 6.3 in the region of measuring element 3 and it again widens in the outlet cross section 6.4, the arrangement being such that the flow passage can be reversed depending on flow direction 7. This channel form of flow passage 6 is advantageous in order to reduce the contamination of sensors 4 and 5, in order to configure the measuring instrument so that it is insensitive to angle, but particularly in order to detect reverse flow, for which purpose, the measuring element 3 preferably has two heating sensors 4 and two temperature sensors 5.

Measuring element 3 is shown in a simplified manner in the top view in FIG. 4. Therein, two separate membranes 14 and 15, in which at least one heat sensor 4 or at least one temperature sensor 5 are embedded, are disposed on measuring element 3. Sensors 4, 5 themselves are protected from contamination by membranes 14 or 15 disposed above sensors 4, 5. Membranes 14, 15 are made of silicon dioxide layers, which are introduced on a substrate 16 of measuring element 3 and in which a conducting layer, for example, of nickel is introduced in order to create sensors 4 and 5. Measuring element 3 is manufactured by semiconductor technology, whereby substrate 16 consists of silicon, so that small structures can be introduced on substrate 16.

The measuring device is clamped to a part 17 of measuring unit 1 (see FIG. 1) in an intake channel (not shown) such that flow passage 6 points in flow direction 7. The flowing mass is detected in the conventional way by sensors 4, 5, for which purpose sensors 4, 5 are connected together with other passive resistances (not shown) to a conventional bridge circuit. These passive resistances can be disposed on the substrate of measuring element 3 or hybrid board 11.

With the use of two heat sensors 4 and two temperature sensors 5 of the same type, flow direction 7 as well as small residual flows can be detected. When using two heating sensors 4 and two temperature sensors 5, the two heating sensors 4 should lie as close to one another as possible, in order to determine the polarization, i.e., flow direction 7 as well as backflow, but without permitting thermal cross-talk from the front to the back sensor due to heat conduction. In normal operation, heat sensors 4 and temperature sensors 5 should not influence one another.

Modifications are also possible within the scope of the concept of the invention. Thus flow direction 7 and backflows can be determined with two measuring instruments of the described type and the utilization in. each of a heating sensor and a temperature sensor 5 on one measuring element 3. For this purpose, flow passage 6 can have the shape of a venturi-type channel. It is also possible to use additional cooling units, which are preferably connected to cooling unit 8 on measuring unit 1 itself, for increased cooling of the measuring instrument.

Although the invention is disclosed with reference to particular embodiments thereof, it will become apparent to those skilled in the art that numerous modifications and variations can be made which will fall within the scope and spirit of the invention as defined by the attached claims.

What is claimed is:

1. A measuring instrument for measuring mass of a flowing medium comprising a measuring unit including a housing having a flow passage for flow of the flowing medium therethrough, and a measuring element in said housing and including at least one temperature sensor and at least one heating sensor on said measuring element, said measuring element being secured in the housing such that said medium flows thereon, said flow passage being a flow channel of rectangular cross-section in said housing, said flow channel having a constricted inlet, a central portion with parallel sides and a widened outlet, said measuring element comprising a substrate and first and second separate membranes mounted on said substrate, said at least one heating sensor being embedded in the first membrane and said at least one temperature sensor being embedded in the second membrane.

2. The measuring instrument of claim 1, wherein said housing has opposite surfaces at said parallel sides of said flow channel, said measuring element being recessed in one of said opposite surfaces of the housing such that an outer face of said measuring element is flush with said one of said opposite surfaces.

3. The measuring instrument of claim 2, wherein said measuring element is fixed in said measuring instrument.

4. The measuring instrument of claim 1, further comprising a cooling unit for said measuring element.

5. The measuring instrument of claim 4, wherein said cooling unit is a component of said housing.

6. The measuring instrument of claim 1, wherein said housing comprises two parts, one part being rigidly mounted on the measuring unit and another part detachably connected to said one part.

7. The measurement instrument of claim 6, wherein said one part includes the flow channel and said another part is a fixed part of said instrument.

8. The measuring instrument of claim 1, further comprising a circuit board in said measuring unit and electronic means on said circuit board connected to said measuring element for measuring the flow of the medium.

9. The measuring instrument of claim 1, wherein two heating sensors and two temperature sensors are respectively mounted adjacent to one another in respective pairs, said first and second membranes being mounted side by side with respect to the flow direction.

10. The measuring instrument of claim 9, wherein the two heating sensors are arranged parallel to one another in the first membrane crosswise to the direction of flow of the flowing medium and the two temperature sensors are arranged parallel to one another in the second membrane in the direction of flow of the flowing medium.

11. A measuring instrument for measuring mass of a flowing medium comprising a measuring unit including a housing having a flow passage for flow of the flowing medium therethrough, and a measuring element in said housing and including at least one temperature sensor and at least one heating sensor, said measuring element being secured in the housing such that said medium flows thereon, said measuring element comprising a substrate and first and second separate membranes mounted on said substrate, said at least one heating sensor being embedded in the first membrane and said at least one temperature sensor being embedded in the second membrane.

12. The measuring instrument of claim 11, wherein two said heating sensors and two said measurement sensors are respectively embedded in said first and second membranes to enable measurement of flow direction and backflow of the flowing medium.

13. The measuring instrument of claim 12, wherein the first and second membranes are arranged in spaced side by side relation relative to the flow direction of the medium, said heating sensors being adjacent to one another in the first membrane, said measurement sensors being adjacent to one another in the second membrane.

14. The measuring instrument of claim 13, wherein said heating sensors and said measurement sensors extend perpendicular to one another.

15. The measuring instrument of claim 13, wherein said temperature sensors extend in the flow direction of the medium and the heating sensors are arranged one after the other crosswise to the flow direction of the medium.

16. The measurement instrument of claim 15, wherein the heating sensors extend parallel to one another and the measurement sensors extend parallel to one another.

17. The measurement instrument of claim 15, wherein said substrate is made of silicon, said membranes being made of silicon dioxide layers into which said sensors are embedded.

18. The measurement instrument of claim 17, wherein said sensors are formed of metal layers embedded in the silicon dioxide layers of the membranes.

19. The measurement instrument of claim 13, wherein said heating and measurement sensors have rectangular outlines, said heating sensors being arranged parallel to one another crosswise to the direction of flow of the medium, said measurement sensors being arranged parallel to one another in the direction of flow of the medium.

* * * * *